United States Patent
Lenz et al.

(10) Patent No.: US 9,810,341 B2
(45) Date of Patent: Nov. 7, 2017

(54) ACTUATING DEVICE

(71) Applicant: Cameron International Corporation, Houston, TX (US)

(72) Inventors: Norbert Lenz, Celle (DE); Klaus Biester, Wienhausen (DE)

(73) Assignee: Cameron International Corporation, Houston, TX (US)

(*) Notice: Subject to any disclaimer, the term of this patent is extended or adjusted under 35 U.S.C. 154(b) by 0 days.

(21) Appl. No.: 14/783,840

(22) PCT Filed: Apr. 9, 2013

(86) PCT No.: PCT/EP2013/001044
§ 371 (c)(1),
(2) Date: Oct. 9, 2015

(87) PCT Pub. No.: WO2014/166509
PCT Pub. Date: Oct. 16, 2014

(65) Prior Publication Data
US 2016/0053912 A1 Feb. 25, 2016

(51) Int. Cl.
*F16K 31/04* (2006.01)
*F16H 25/20* (2006.01)

(52) U.S. Cl.
CPC ....... *F16K 31/047* (2013.01); *F16H 25/2015* (2013.01); *F16K 31/048* (2013.01);
(Continued)

(58) Field of Classification Search
CPC ......... F16H 25/2015; F16H 2025/2075; F16H 2025/2078; F16H 2025/2068; F16K 31/047
(Continued)

(56) References Cited

U.S. PATENT DOCUMENTS 2,860,266 A * 11/1958 Schrader ............ F16H 25/2018
251/129.11
3,659,683 A *  5/1972 Betzing ............... F16H 25/2204
188/162

(Continued)

FOREIGN PATENT DOCUMENTS

DE          10134428 A1      1/2003
DE   WO 2008125136 A1 * 10/2008 ......... F16H 25/2454

(Continued)

OTHER PUBLICATIONS

PCT International Search Report; Application No. PCT/EP2013/001044; Dated Jan. 24, 2014; 4 pages.

*Primary Examiner* — Seth W Mackay-Smith
(74) *Attorney, Agent, or Firm* — Fletcher Yoder, P.C.

(57) ABSTRACT

An actuating device for displacing a control device, such as a valve, gate valve, or the like, particularly for use in oil or gas production systems. The actuating device includes at least one torque motor having an electric drive and a thread drive that is rotatable by the electric drive. The actuating device also includes a threaded spindle, a screw nut, a torque control/regulation device, and a position detection device. The threaded spindle is axially displaceable to displace a flow control device between an advanced position and a retracted position. The torque motor is connected to the screw nut in a rotationally-fixed manner and the position detection device is assigned to the threaded spindle to determine the axial position thereof.

19 Claims, 4 Drawing Sheets (52) U.S. Cl.
CPC ............... *F16H 2025/2068* (2013.01); *F16H 2025/2075* (2013.01)

(58) Field of Classification Search
USPC ....................................... 251/129.11, 129.12
See application file for complete search history.

(56) References Cited

U.S. PATENT DOCUMENTS

| | | | | |
|---|---|---|---|---|
| 4,920,811 A * | 5/1990 | Hopper | ............... | E21B 33/0355 251/129.11 |
| 5,195,721 A * | 3/1993 | Akkerman | ............ | F16D 27/105 192/56.1 |
| 5,832,779 A * | 11/1998 | Madrid | ................... | F16H 25/20 137/72 |
| 6,223,971 B1 * | 5/2001 | Sato | ........................ | B23K 11/31 228/12 |
| 6,257,549 B1 | 7/2001 | Hopper | | |
| 6,446,519 B1 * | 9/2002 | Biester | ................... | G05G 15/00 251/129.11 |
| 6,453,761 B1 * | 9/2002 | Babinski | ................. | H02K 7/06 29/898.06 |
| 6,561,480 B1 | 5/2003 | Komiya et al. | | |
| 6,603,228 B1 * | 8/2003 | Sato | ........................ | B23K 11/31 310/12.32 |
| 6,953,084 B2 * | 10/2005 | Greeb | ..................... | E21B 34/02 166/332.1 |
| 6,981,428 B2 * | 1/2006 | Donald | ................. | F16K 31/047 74/89.26 |
| 7,007,922 B2 | 3/2006 | Biester et al. | | |
| 7,172,169 B2 * | 2/2007 | Biester | .................... | F16H 25/20 251/129.11 |
| 7,231,842 B2 | 6/2007 | Biester et al. | | |
| 7,615,893 B2 | 11/2009 | Biester et al. | | |
| 8,156,838 B2 * | 4/2012 | Batosky | ................ | E05F 15/622 74/424.71 |
| 8,274,245 B2 * | 9/2012 | Biester | ................ | F16H 25/2454 137/81.1 |
| 8,281,863 B2 | 10/2012 | Voss | | |
| 8,459,133 B2 * | 6/2013 | Inoue | .................. | F16H 25/2015 74/567 |
| 8,978,687 B2 * | 3/2015 | Lenz | ..................... | F16K 31/047 137/81.2 |
| 2003/0167864 A1 | 9/2003 | Biester et al. | | |
| 2004/0164623 A1 * | 8/2004 | Suzuki | .................. | H02K 15/02 310/49.18 |
| 2006/0071190 A1 * | 4/2006 | Pfister | .................. | F16K 31/047 251/129.11 |
| 2012/0153198 A1 * | 6/2012 | Biester | ................ | E21B 33/0355 251/129.12 |
| 2013/0056658 A1 * | 3/2013 | Borchgrevink | ......... | F16K 31/04 251/129.01 |

FOREIGN PATENT DOCUMENTS

| | | |
|---|---|---|
| EP | 0984133 A1 | 3/2000 |
| GB | 2364396 A | 1/2002 |
| WO | 2005014973 A2 | 2/2005 |
| WO | 2007045260 A1 | 4/2007 |
| WO | 2008/125136 | 10/2008 |
| WO | 2011/006519 | 1/2011 |
| WO | 2011/009471 | 1/2011 |
| WO | 2012/167808 | 12/2012 |

* cited by examiner

ACTUATING DEVICE

CROSS-REFERENCE TO RELATED APPLICATION

This application is a US National Stage of International Application No. PCT/EP2013/001044, entitled "ACTUATING DEVICE", filed Apr. 9, 2013, which is herein incorporated by reference in its entirety.

BACKGROUND

Prior actuating devices for displacing a control device including a valve, a gate valve, or the like, in particular for use in oil or gas production systems comprise a motor-gear unit containing a corresponding electric drive. However, such actuating devices may have a large structural design and many complex components. Additionally, such actuating devices are costly and have inaccurate torque control and correspondingly poor regulation of the controlled device, such as a valve.

BRIEF DESCRIPTION OF THE DRAWINGS

For a detailed description of examples of the disclosure, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

It is the object of the present disclosure to provide an actuating device having a compact structural design and fewer components and being less expensive together with an accurate torque control or regulation at the same time.

The present disclosure refers to an actuating device for displacing a control device including a valve, a gate valve, or the like, in particular for use in oil or gas production systems, the actuating device including at least one torque motor as an electric drive, and a thread drive that is rotatable by means of the motor and includes at least one of a threaded spindle and a screw nut. The threaded spindle is substantially axially displaceable for displacing the control device between an advanced position and a retracted position. The torque motor includes a hollow shaft connected to the screw nut in a rotationally fixed manner, and a position detection device is particularly assigned to the threaded spindle for determining the axial position thereof.

According to embodiments of the present disclosure, a torque control/regulation device is assigned to the electric drive device and particularly to the torque motor, and a position detection device is particularly assigned to the rotating spindle for determining the axial position thereof.

Such a torque motor is a high-torque, gearless direct drive with a comparatively small number of revolutions (e.g., revolutions per minute ("RPM")). Such a torque motor is a low-maintenance motor and serves according to the various embodiments to directly drive the screw nut via its rotationally fixed connection to the hollow shaft of the torque motor. Upon rotation of the screw nut the threaded spindle is moved correspondingly axially maximally between its advanced position and its retracted position. The corresponding movement can be detected by the position detection device.

Based on this detection of the axial position of the threaded spindle and with the corresponding torque control/regulation device, a torque limitation is performed according to embodiments of the present disclosure so as to particularly prevent a displacement of the threaded spindle beyond its advanced or retracted position. Such a displacement might otherwise damage the actuating device or the control device connected thereto. This means that with the help of the position detection device the exact axial position of the threaded spindle can be detected on the one hand and the torque "exerted by the torque motor can be detected by means of the torque control/regulation device. It can be determined by way of these two parameters in which axial position of the threaded spindle which amount of torque is needed to be exerted by the torque motor for further axial displacement of the threaded spindle.

A torque limitation is thereby possible in a simple and inexpensive manner. The torque limitation is performed through a corresponding torque control or regulation of the motor, with the axial position of the threaded spindle being known. Due to the axial position of the threaded spindle, the corresponding position of, for example, the gate valve of the control device is particularly known.

Since safety couplings, gear units or the like can be omitted in the transmission of the drive force from the torque motor to the threaded spindle and to the screw nut, respectively, a very compact design for the actuating device is achieved according to embodiments of the present disclosure. Additionally, fewer components are required, resulting in a lower failure probability.

According to the present disclosure, the torque motor serves as a slowly running (i.e., low-RPM) drive to directly displace the thread drive and, via the thread drive, to displace the control device without any additional coupling or gear units therebetween.

The corresponding thread drive may, for example, be configured as a roller thread drive. An example of the above-mentioned control device is a so-called gate valve (e.g., a slide valve or a stop valve) in the case of which a valve slide is acted upon, in the field of natural gas or crude oil production, by a corresponding borehole pressure that moves the valve into the closed position and thus also applies pressure to the threaded spindle in a corresponding manner. To prevent a corresponding pressure-induced rotation of the threaded spindle, the torque motor may be operated with a standby current that produces a sufficient amount of holding torque. The torque motor thus enables a position of the threaded spindle to be maintained because of the corresponding standby current. When the holding torque is eliminated by a corresponding propulsion current of the torque motor, the control device can subsequently be displaced by the thread drive in a corresponding displacement direction. For the simplified arrangement of the torque motor and thus also for the simplification of the actuating device, a rotor of the torque motor may be directly fastened to an outside portion of the hollow shaft.

For reasons of redundancy it is conceivable that the electric drive and thus the torque motor contain a redundant structure. For example, this can be accomplished in that two torque motors are arranged on the hollow shaft. In case of failure of one torque motor, the other torque motor can still rotate the hollow shaft and thus the thread drive for displacing the control device. It is also possible to use a motor with two independent winding systems.

Since the actuating device according to the present disclosure may be exposed to high pressures, external impacts, or the like, the actuating device normally comprises a housing. To disassemble, if possible, parts of the actuating device for maintenance, replacement or other reasons, the actuating device and particularly the actuator housing thereof may be composed of two or more detachably interconnected housing sections. The electric drive with thread drive may be arranged in a first housing section and a spring assembly in a second housing section. Such a spring assembly comprises at least one spring that, upon extension of the threaded spindle, is compressed and provides for an adequate pressure application so as to close the slide valve, the gate valve, or the like, for instance in case of failure of the torque motor and in the absence of borehole pressure. This means that the actuator can be operated as a fail-safe actuator.

To be able to connect the threaded spindle in a simple way, for instance to the gate valve or the like, a spindle head may be detachably fastened to an extension end of the threaded spindle. The spindle head serves to, for example, fasten the gate valve or other parts of the control device and can also be used for arranging further parts between the control device and the threaded spindle.

In some embodiments, the spindle head may be supported in a guide sleeve in an axially displaceable, but non-rotatable manner. This means that the spindle head can be moved back and forth in the guide sleeve in the case of a corresponding axial displacement of the threaded spindle. The guide sleeve can be arranged in the first housing section or also form a termination of the first housing section that is oriented towards the second housing section.

To guide the spindle head, the guide sleeve may comprise at least one guide slot that extends in the displacement direction of the threaded spindle and is engaged by a guide pin protruding radially outwards relative to the spindle head. Such a guide pin thereby prevents rotation of the spindle head and permits the displacement thereof linearly in axial direction.

To connect the control device to the threaded spindle via the spindle head while avoiding complexity, the spindle head may be connected to a piston rod at an end oriented towards the control device. This piston rod bridges the distance between spindle head and threaded spindle, respectively, and the gate valve of the control device for example.

The position detection device may be arranged at an end of the actuating device, in particular at the end opposite to the control device. In some embodiments, a sensor element is assigned to the position detection device of the threaded spindle. This means that the axial position of the threaded spindle is directly determined by the corresponding sensor element and it serves to correspondingly evaluate the axial position of the threaded spindle and, through the position thereof, also to determine the position of piston rod and gate valve, for example.

To be able to detachably fasten the actuating device to the control device while avoiding complexity, the actuating device may comprise a connection device by which the device housing can be flange-mounted on a corresponding control device housing.

To be able to guide the piston rod in the second housing section, an opening insert which is connected to the piston rod may be displaceably supported in the second housing section.

The opening insert may, for example, also be used for forming a stop for the spring assembly in that the spring assembly is operatively arranged substantially between the opening insert and the second housing section.

To be able to rotatably support the hollow shaft in the first housing section in a reliable way, the hollow shaft may be rotatably supported on its two end sections. In particular, the first end section may be rotatably supported on its outside relative to the guide sleeve and the first housing section, respectively, and the second end section may be rotatably supported on its outside relative to a housing lid closing the first housing section. Additionally, the piston rod may be directly connected to the threaded spindle, or to the spindle head, in a detachable manner.

In one embodiment, and in addition or as an alternative to the spring assembly, a pressure application into the retracted position of the threaded spindle may be exerted in that the opening insert is configured as a piston that is movable in a fluid-actuated manner in the second housing section as a cylinder housing. In this case, the second housing section is filled with fluid and particularly with oil at both sides of the piston. This fluid can slow down the movement of the piston so as to prevent an excessively fast movement of the piston particularly upon displacement into the retracted position of the threaded spindle. It this manner, the corresponding sides of the piston may be connected within the second housing section via a throttle check valve that is formed between a front side and a rear side of the piston. Additionally, in some cases the second housing section is filled with oil in addition to the first housing section.

In certain embodiments, an oil compensator is assigned to the cylinder housing. In some cases, the oil compensator may be assigned to the first housing section, the second housing section, or to both the first and second housing sections. Such an oil compensator may be arranged inside or also outside of the corresponding device housing.

In one embodiment of the present disclosure, the second housing section with a spring assembly and an opening insert may also be dispensed with, so that in this case the actuating device can be directly fastened by means of the first housing section and a corresponding connection device to the control device housing.

In such a case, the piston rod may protrude from the second housing section, or a corresponding gate valve may project into the second housing section to be, for example, connected to the spindle head. To permit a sealing of the passage relative to the exterior in such a case, a sealing means may be arranged on the piston rod and the gate valve, respectively. The sealing means may be a rod seal which seals the medium in the well (e.g., oil or gas).

Figure 1:
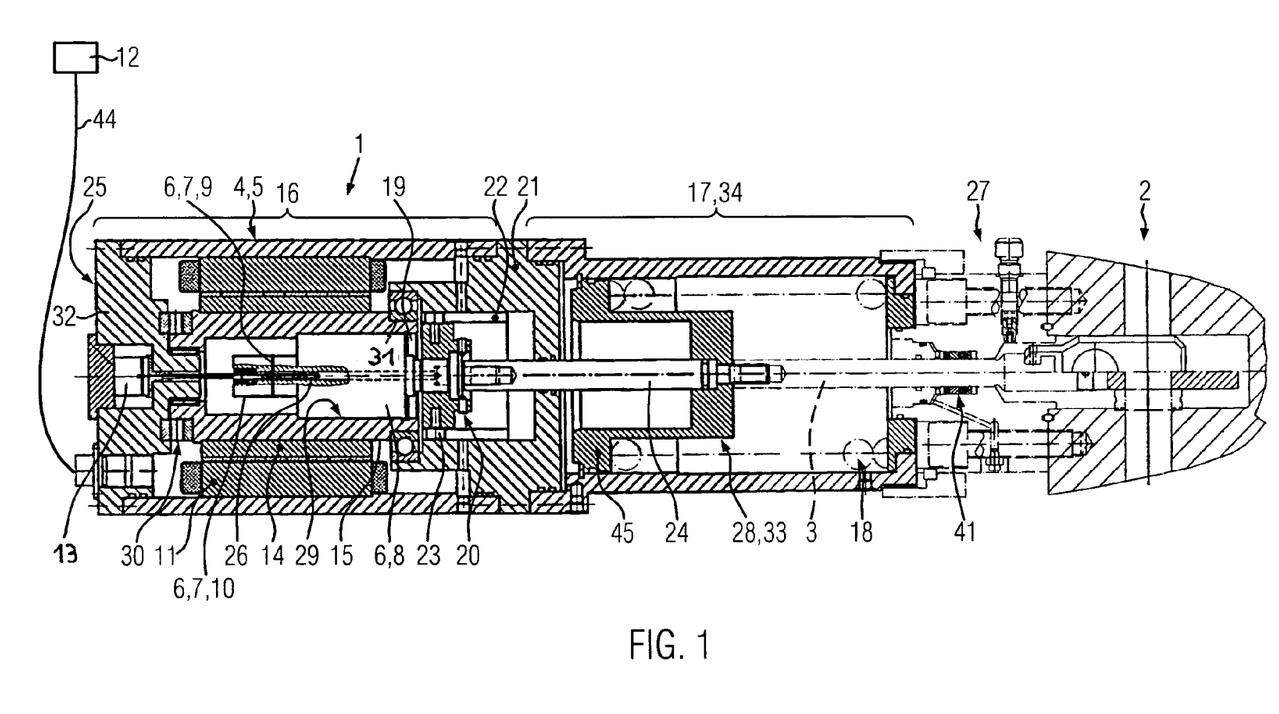
FIG. 1 shows a longitudinal section through a first embodiment of an actuating device according to the disclosure, for actuating a corresponding control device.

Turning now to FIG. 1, a longitudinal section through a first embodiment of an actuating device 1 is shown according to the disclosure. The actuating device comprises a device housing composed of a first housing section 16 and a second housing section 17. A connection device 27 is provided between the second housing section 17 and a control device 2. With the device it is possible to flange-mount the actuating device 1 on an outside of a control device housing.

The control device 2 is used in an oil or gas production system in the form of a slide valve, a blowout preventer, or the like, and serves to control the flow of gas or oil through a corresponding line. Inside the control device, a gate valve 3 or the like is displaceably supported.

In the present embodiment, an electric drive 5 is arranged first housing section 16 and comprises at least one torque motor 4. Instead of only one torque motor 4, it is also possible to arrange two torque motors in parallel with each other, so that one torque motor can replace the other one in case of failure thereof. It is also conceivable to use a torque motor with two independent coils, so that each coil can be used for driving a corresponding hollow shaft 11. Although such a redundant structure of the electric drive 5 is not required for safety reasons, it may exist to satisfy various safety rules.

Figure 2:
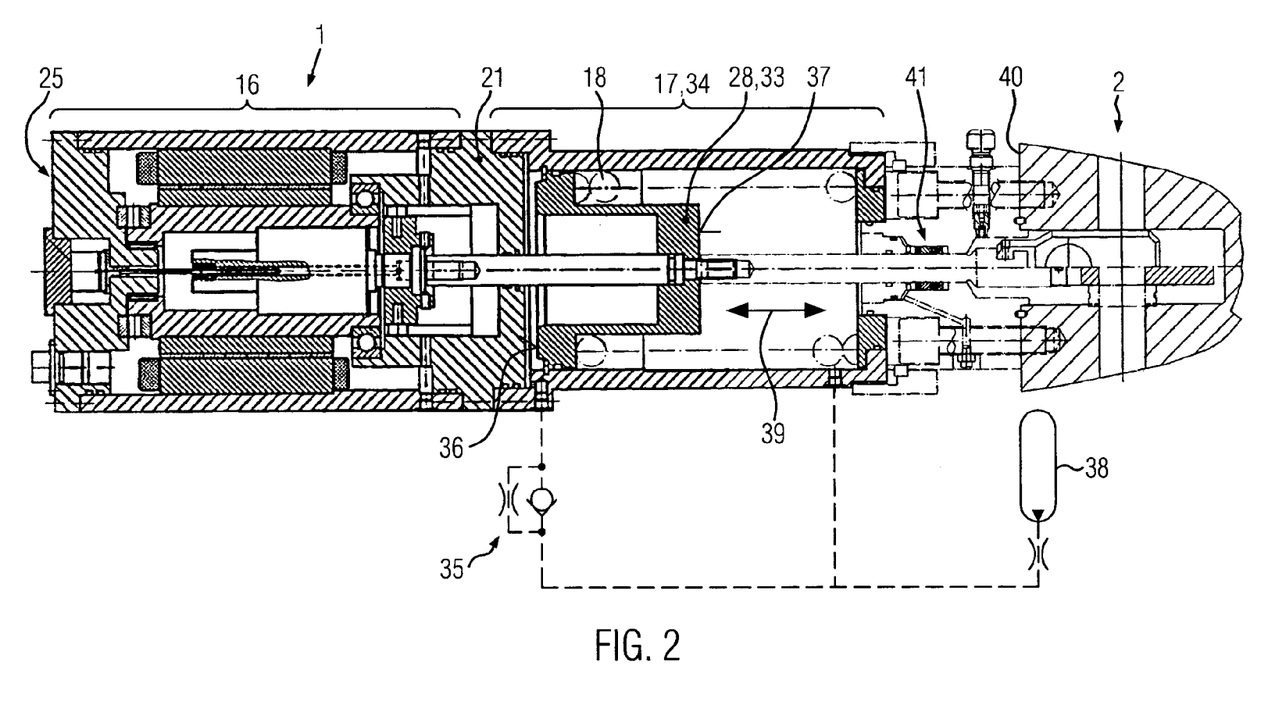
FIG. 2 shows a section, analogously to FIG. 1, through a second embodiment.

The torque motor 4 comprises a stator 43 and a rotor 14. The rotor 14 is fastened to an outside 15 of the hollow shaft 11. This means that the hollow shaft 11 rotates together with the rotor 14. The shaft is connected to a screw nut 8 of a thread drive 6 in a rotationally fixed manner. Inside the screw nut 8, a threaded spindle 7 is rotatably supported as a further part of the thread drive 6. Upon a corresponding rotation of the screw nut 8 the threaded spindle 7 is axially shifted in displacement direction 39, for example as shown in FIG. 2. In FIG. 1, the threaded spindle is arranged in a retracted position 10. A corresponding advanced position 9 is also shown in FIG. 1 in a simplified form through a corresponding arrangement of an end of the threaded spindle 7.

The hollow shaft 11 is rotatably supported on end sections 29 and 30. On the first end section 29 the hollow shaft is supported on its outside 31 via a corresponding support device on an inside of a guide sleeve 21. The guide sleeve 21 is inserted from an open end of the first housing section 16 into the section at least in part. On its second end section 30 the hollow shaft 11 is rotatably supported via a further support device on an inside of a housing lid 32. The housing lid 32 is inserted opposite to the guide sleeve 21 on the other open end of the first housing section 16 partly into the section.

A position detection device 13 is arranged in the housing lid 32. The device comprises a sensor element 26 that extends up into an inner bore of the threaded spindle 7. A corresponding axial displacement of the threaded spindle 7 is detected by the sensor element 26. As a result, the exact axial position of the threaded spindle 7 inside the actuating device 1 and thus the displacement of the gate valve 3 relative to the control device 2 can be detected.

The torque motor 4 comprises a torque control/regulation device 12 which, in the illustrated embodiment of FIG. 1, is arranged outside the actuating device 1. For example, see connection line 44 and torque control/regulation device 12. The connection line 44 is connectable at the end 25 of the actuating device 1 by way of a corresponding connection device. It should however be noted that the connection line 44 can also simultaneously serve to transmit power and/or data.

The guide sleeve 21 comprises an inner bore in which a spindle head 20 is displaceably supported in displacement direction 39. The spindle head 20 is detachably fastened to an extension end 19 of the threaded spindle 7. Two guide pins or guide rollers 23 project radially outwards from the spindle head 20. The guide pins or guide rollers 23 are guided in guide slots 22 of the guide sleeve 21 such that the spindle head 20 is displaceable in a rotationally fixed, but axially displaceable manner in the corresponding inner bore of the guide sleeve 21.

The guide sleeve 21 is arranged between the first housing section 16 and the second housing section 17. Particularly, the guide sleeve 21 may be connected to both housing sections 16, 17 for instance by screw connections, or the like. Furthermore, a corresponding sealing is provided in the area of the guide sleeve 21 relative to the housing sections. The interior of both the first and the second housing section 16, 17 may be filled with oil or another fluid.

In the second housing section 17, an opening insert 28 is displaceably supported. The insert is connected to an end of a piston rod 24. The piston rod 24 is fastened with its other end to the spindle head 20. Thus, the piston rod 24 is axially shifted in a corresponding manner relative to the spindle head 20 and in a corresponding manner relative to the displacement of the threaded spindle 7. The piston rod 24 protrudes in the direction of control device 2 out of the opening insert 28. The gate valve 3 of the control device 2 is, for example, fastened to the protruding end.

Upon an axial displacement of the piston rod 24, the opening insert 29 is entrained against a corresponding pressure application by a spring assembly 18. The assembly is operatively arranged between a radially outwardly protruding end flange 45 of the opening insert 28 and the opposite end of the second housing section 17. A sealing means 41 is provided for sealing the gate valve 3 during guidance through or out of the second housing section 18.

The torque of the torque motor 4 may be limited using the position detection by the position detection device 13 and the torque detection by the torque control/regulation device 12. This prevents collision damage that might occur in the case of an excessively wide movement of the gate valve 3 towards the control device. This applies by analogy also to a displacement of the threaded spindle 7 into the retracted position.

In the first embodiment according to FIG. 1, the spindle head 20 and thus the piston rod 24 and the opening insert 28 connected thereto are moved towards control device 2 when the threaded spindle is extended towards the advanced position 9. The spring assembly 18 is thereby compressed. The energy stored thereby in the spring assembly can displace the gate valve 3 into its closing position if there is, for example, no borehole pressure in the control device 2. If the borehole pressure is sufficiently great, a corresponding force will act on the gate valve 3 and thus on the piston rod 24 and the threaded spindle 7. The borehole pressure will then support the resetting force of the spring assembly 18.

If a specific position has been attained by axial displacement of the threaded spindle 7, the torque motor can statically hold the axial position by means of a corresponding holding current. However, in the event that the control device is to be closed, the holding current may be cut back and, after it has been cut back, the torque motor will work as a generator and slow down a corresponding closing speed to an acceptable speed. This means that the torque motor will also operate against the action by borehole pressure and/or the action by the spring assembly. The energy produced during this operation of the generator will normally be discharged as heat into the water or into another medium surrounding the actuating device 1.

However, there is also the possibility of using the energy generated in this way for transmitting an error message to a control center. This may be useful where the actuating device 1 is no longer supplied with power, for example due to a corresponding malfunction.

FIG. 2 shows a longitudinal section, by analogy with FIG. 1, through a second embodiment of the actuating device 1 according to the disclosure. The embodiment shown in FIG. 2 is substantially of the same structure as the first embodiment according to FIG. 1. Only the differences between the two embodiments will mainly be discussed hereinafter; otherwise, the description of the actuating device 1 according to FIG. 1 will continue to be applicable.

The embodiment according to FIG. 2 particularly shows another reduction or attenuation of the closing speed of the gate valve (i.e., the speed for returning the threaded spindle 7 into the retracted position 10). The oil pressure inside the second housing section 17 is particularly exploited. Like the first housing section 16, the second housing section 17 is filled in the interior with oil or another fluid. The opening insert 28 is sealed relative to an inside of the second housing section 17, so that the opening insert 28 can be regarded as a piston 33. The piston is axially displaceably arranged in the second housing section 17 as a corresponding cylinder housing 34. A throttle check valve 35, particularly an adjustable one, is arranged between a piston front side 35 and a piston rear side 37 of the piston 33 in an oil circuit. When the piston 33 is moved in displacement direction 39 up into the position shown in FIG. 2, oil is pressed accordingly from the piston front side 36 to the piston rear side 37 via the throttle check valve 35. This will attenuate a corresponding movement. Different volumes of the oil due to particularly different temperatures depending on the respective field of use of the actuating device 1 can be compensated by an oil compensator 38. The compensator 38 is also arranged in the corresponding oil circuit. It should be noted, however, that the corresponding members of the oil circuit (e.g., throttle check valve 35 and oil compensator 38, respectively) and lines connecting the same, may also be arranged in the interior of the actuating device 1 and particularly of the second housing section 17.

The remaining components and functions of the embodiment according to FIG. 2 correspond to those of FIG. 1.

Figure 3:
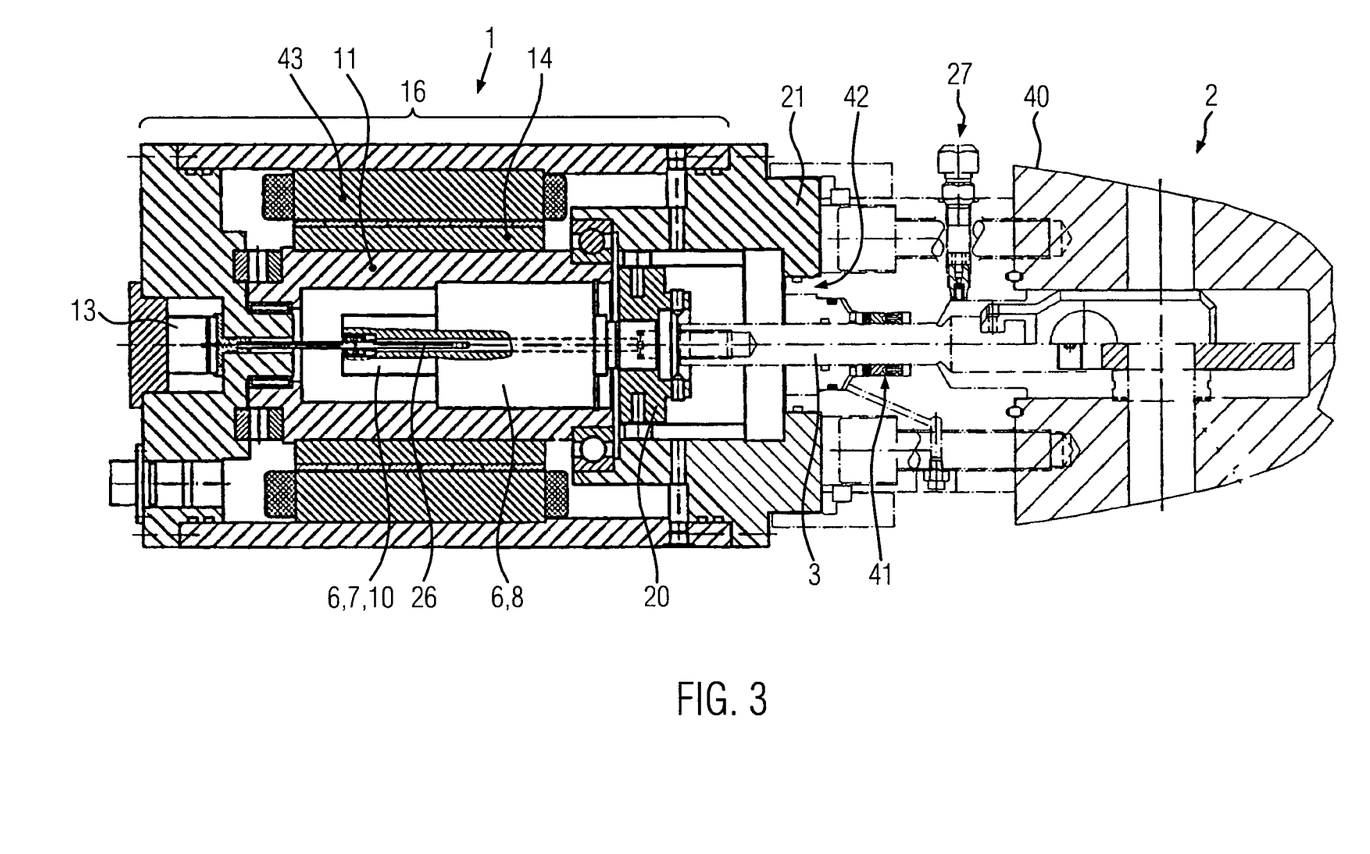
FIG. 3 shows a longitudinal section, analogously to FIG. 1, through a third embodiment.

FIG. 3 shows a longitudinal section through a third embodiment by analogy with FIGS. 1 and 2.

This embodiment particularly differs from the preceding embodiments by the use of only one first housing section 16. In the interior of the first housing section 16, the same members as in the embodiments according to FIGS. 1 and 2 are arranged. However, the actuating device 1 is directly fastened by means of the connection device 27 between the first housing section 16 and guide sleeve 21, respectively, and the control device housing 40. A difference as compared with the former embodiments is that the gate valve 3 is connected to the spindle head 20 without interposition of a piston rod 24 or an additional arrangement of the opening insert 28. A further difference is that a corresponding opening 42 of the guide sleeve 21 in the direction of control device 2 has a larger diameter than in the preceding embodiments.

As a result, in the embodiment of FIG. 3 the second housing section 17 with the spring assembly 18 and further devices inside the second housing section 17 has been omitted. In this case, however, there is no additional device for displacing the gate valve into the closed position if there is no sufficient borehole pressure pressing the gate valve 3 into the direction of the retracted position 10 of the threaded spindle 7. Thus, in the case of a borehole pressure equal to or smaller than the ambient pressure, which depends on the water depth if the actuating device 1 is arranged on the sea bottom for example, the gate valve 3 has to be moved by the electric drive 5 into the corresponding closed position by shifting the threaded spindle 7 into the retracted position 10.

Figure 4:
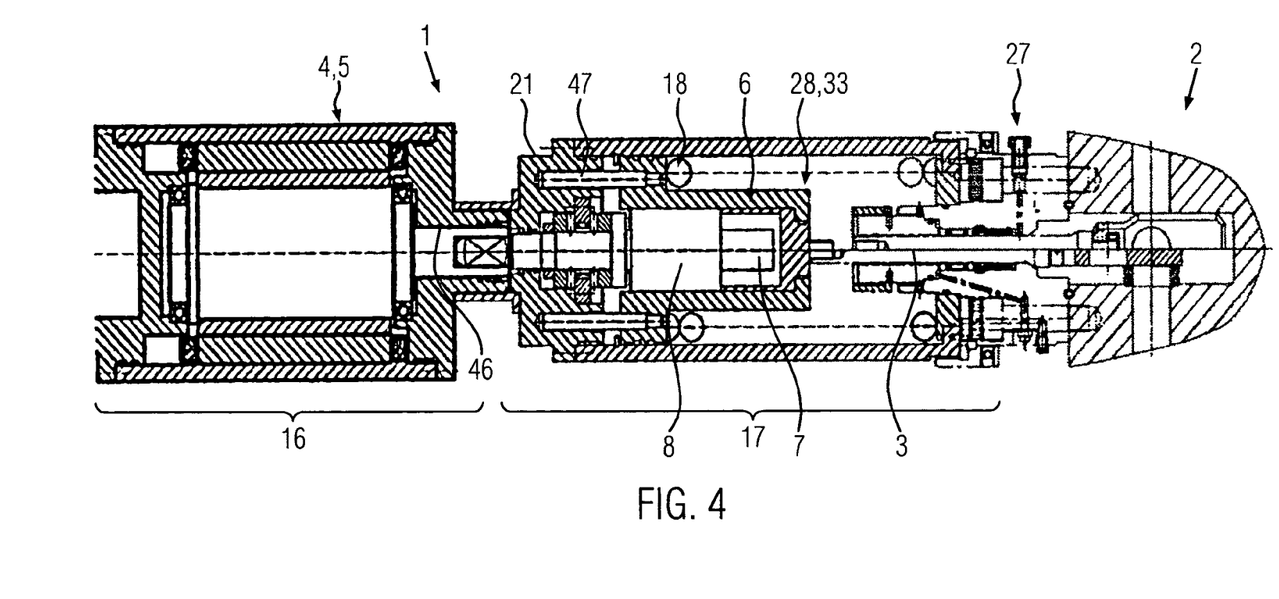
FIG. 4 shows a longitudinal section, analogously to FIG. 1, through a fourth embodiment.

FIG. 4 shows a longitudinal section by analogy with the preceding figures for a fourth embodiment. The embodiment differs from the preceding embodiments especially in that only the torque motor 4 is arranged in the first housing section 16 as the electric drive 5 while the thread drive 6 is also arranged in the second housing section 17 next to the spring assembly 18. In this case a corresponding torque is transmitted by the torque motor. The torque is converted into a linear movement of the gate valve 3 by the corresponding thread drive 6. To this end the torque motor 4 is connected by means of a shaft 46 to the threaded spindle 7. The screw nut 8 is then axially displaceable by correspondingly rotating the threaded spindle 7 and entrains the opening insert 28 and piston 33, respectively, during its axial displacement. The gate valve 3 which is externally arranged on the opening insert 28 is also axially displaced by the entrainment. The position detection device 13 may be assigned to the screw nut 8 to determine the axial position thereof.

In the embodiment according to FIG. 4, a hollow shaft is not required in the torque motor. Instead, the rotor can be directly connected to the corresponding solid shaft 46. There is the possibility that the shaft 46 is provided on its end facing the second housing section with an insertion opening in which the threaded spindle is inserted directly or by means of an extension member. The torque is thereby transmitted from the torque motor to the threaded spindle 7. However, it is also possible to use a hollow shaft that is then connected in a corresponding manner to the shaft 46 in a rotationally fixed manner.

Furthermore, pins 47 can be used as torque absorbers. The torque generated by the torque motor has to be absorbed because otherwise a co-rotation of the piston 33 might take place. The corresponding pins 47 are supported in openings of the piston 33 and also in the corresponding guide 21. Torque could be absorbed by analogy with FIG. 1, for example by guide sleeve 21 and guide slots 22, which are engaged by guide pins 23. Instead of the guide pins 23, guide rollers are also useable. The torque absorption should show as little friction as possible; thus, the corresponding pins 47 are for example movable in roller-supported longitudinal guides.

It should be noted that a corresponding division of electric drive in the first housing section 16 and spring assembly with thread drive in the second housing section is also useable if the electric drive comprises a gearing or a coupling.

The actuating device according to the disclosure is distinguished by a very compact structural design where additional gear units, coupling units, or the like, can be dispensed with. Since fewer components are used in the actuating device 1, this also reduces the costs and failure probability. Moreover, an exact detection of the torque both for actuating the torque motor and for torque limitation is possible as a result of the torque control/regulation device 12. The motor works together with the corresponding position detection device so as to detect a corresponding torque of the torque motor in response to the position of the threaded spindle 7 and thus of the gate valve 3.

The invention claimed is:

1. An actuating device, comprising:
   an electric drive comprising at least one torque motor;
   a thread drive comprising a threaded spindle and a screw nut, wherein the at least one torque motor is connected to the screw nut in a rotationally-fixed manner and the threaded spindle is axially displaceable to displace a flow control device between an advanced position and a retracted position, and wherein a rotor of the at least one torque motor circumferentially surrounds a hollow shaft, the hollow shaft circumferentially surrounds the screw nut, and the hollow shaft connects the at least one torque motor to the screw nut in the rotationally-fixed manner;
   a position detection device configured to monitor an axial position of the threaded spindle; and
   a torque control/regulation device configured to control the at least one torque motor based at least in part on the axial position of the threaded spindle.

2. The actuating device of claim 1, wherein the rotor of the at least one torque motor is fastened to an outside of the hollow shaft.

3. The actuating device of claim 2, wherein at least two torque motors are fastened to the outside of the hollow shaft.

4. The actuating device of claim 2, wherein the hollow shaft is rotatably supported on its two end sections and wherein the first end section is rotatably supported on its outside relative to a guide sleeve and the second end section is rotatably supported relative to a housing lid closing the first housing section.

5. The actuating device of claim 1, comprising: at least two housing sections detachably connected to one another, wherein the electric drive is arranged in a first housing section and a spring assembly is arranged in a second housing section.

6. The actuating device of claim 5, wherein the second housing section comprises a connection device configured to be flange-mounted a housing of the flow control device.

7. The actuating device of claim 5, wherein an opening insert that is connected to a piston rod is displaceably supported in the second housing section, and wherein the spring assembly is operatively arranged between the opening insert and the second housing section.

8. The actuating device of claim 1, wherein a spindle head is detachably fastened to an extension end of the threaded spindle, and wherein the spindle head is supported in a guide sleeve in an axially displaceable, but non-rotatable manner.

9. The actuating device of claim 8, wherein the guide sleeve comprises at least one guide slot extending in the displacement direction of the threaded spindle, which is engaged by a guide element radially protruding outwards relative to the spindle head.

10. The actuating device of claim 8, wherein the spindle head is connected at its side facing the flow control device to a piston rod.

11. The actuating device of claim 10, wherein an opening insert that is connected to the piston rod is displaceably supported in the second housing section.

12. The actuating device of claim 11, wherein the opening insert is configured as a piston that is movable in fluid-actuated fashion in the second housing section as a cylinder housing.

13. The actuating device of claim 12, wherein a throttle check valve device is formed between a front side and a rear side of the piston.

14. The actuating device of claim 12, wherein a fluid compensator is assigned to the cylinder housing.

15. The actuating device of claim 10, wherein a sealing head is arranged on the piston rod.

16. The actuating device of claim 1, wherein the position detection device is arranged at an end of the actuating device, with a sensor element of the position detection device configured to detect the axial position of the threaded spindle.

17. The actuating device of claim 1, wherein the torque motor is a dual winding torque motor.

18. The actuating device of claim 1, comprising the flow control device, wherein the flow control device comprises a gate valve.

19. A method of operating an actuating device, comprising:
   operating at least one torque motor to drive rotation of a screw nut of a thread drive, thereby causing axial displacement of a threaded spindle of the thread drive and a flow control device coupled to the threaded spindle, wherein a rotor of the at least one torque motor circumferentially surrounds a hollow shaft, the hollow shaft circumferentially surrounds the screw nut, and the hollow shaft connects the at least one torque motor to the screw nut in a rotationally-fixed manner to enable the at least one torque motor to drive rotation of the screw nut;
   monitoring an axial position of the threaded spindle using a position detection device; and
   controlling the at least one torque motor to adjust a torque applied by the at least one torque motor based at least in part on the axial position using a torque control/regulation device.

* * * * *